US010457409B2

(12) United States Patent
Laramee et al.

(10) Patent No.: US 10,457,409 B2
(45) Date of Patent: Oct. 29, 2019

(54) ADAPTIVE ENGINE EXHAUST SIGNATURE SUPPRESSOR

(71) Applicant: Bell Helicopter Textron Inc., Fort Worth, TX (US)

(72) Inventors: Robert Michael Laramee, Fort Worth, TX (US); David L. Miller, North Richland Hills, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 922 days.

(21) Appl. No.: 15/090,013

(22) Filed: Apr. 4, 2016

(65) Prior Publication Data

US 2016/0333797 A1 Nov. 17, 2016

Related U.S. Application Data

(60) Provisional application No. 62/142,330, filed on Apr. 2, 2015.

(51) Int. Cl.
*B64D 33/04* (2006.01)
*F02K 1/82* (2006.01)

(52) U.S. Cl.
CPC .............. *B64D 33/04* (2013.01); *F02K 1/825* (2013.01); *B64D 2033/045* (2013.01); *F05D 2220/90* (2013.01)

(58) Field of Classification Search
CPC ... B64D 33/04; B64D 2033/045; F02K 1/825; F02K 1/822; F02K 1/08; F02K 1/09; F02K 1/82; F02K 1/00; F02K 1/006; F01D 25/30
See application file for complete search history.

(56) References Cited

U.S. PATENT DOCUMENTS

| 2,828,603 | A | * | 4/1958 | Laucher | F02K 1/08 239/265.27 |
| 2,955,414 | A | * | 10/1960 | Hausmann | F02K 3/12 60/242 |
| 4,290,262 | A | * | 9/1981 | Wynosky | F02K 1/34 60/262 |
| 4,527,388 | A | * | 7/1985 | Wallace, Jr. | F02K 1/09 239/265.19 |
| 2006/0243822 | A1 | * | 11/2006 | Maslar | F01N 1/165 239/265.35 |

* cited by examiner

*Primary Examiner* — Scott J Walthour
*Assistant Examiner* — Jacek Lisowski
(74) *Attorney, Agent, or Firm* — Lightfoot & Alford PLLC (57) ABSTRACT

An exhaust system has an engine exhaust plane associated with an entrance to the exhaust system, an exhaust exit plane associated with an exit of the exhaust system, a forward cap movable relative to the engine exhaust plane and configured to selectively intersect the engine exhaust plane, and an aft cap movable relative to the exhaust exit plane and configured to selectively intersect the exhaust exit plane.

20 Claims, 10 Drawing Sheets

ADAPTIVE ENGINE EXHAUST SIGNATURE SUPPRESSOR

CROSS-REFERENCE TO RELATED APPLICATIONS

This patent application claims the benefit of the filing date of the U.S. Provisional Patent Application Ser. No. 62/142,330, filed on 2 Apr. 2015 and entitled "Adaptive Engine Exhaust Signature Suppressor," the entire content of which is hereby expressly incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Exhaust systems, such as those associated with aircraft, may expel exhaust at undesirably high temperatures and/or may provide line of sight viewing of components that are heated to undesirably high temperatures. In some cases, the excessive temperatures may contribute to an undesirable heat signature that is perceptible by heat based sensing devices. Further, many exhaust systems decrease fuel efficiency of an aircraft when utilized.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
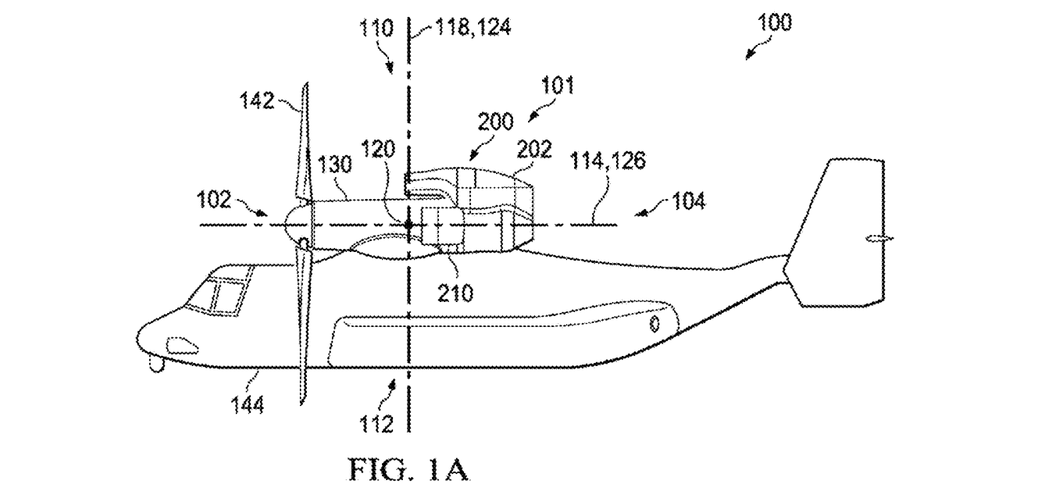
FIGS. 1A and 1B are orthogonal right side views of an aircraft comprising an exhaust system according to an embodiment of the disclosure with the aircraft shown in an airplane mode and a hovering mode, respectively.
Figure 1B:
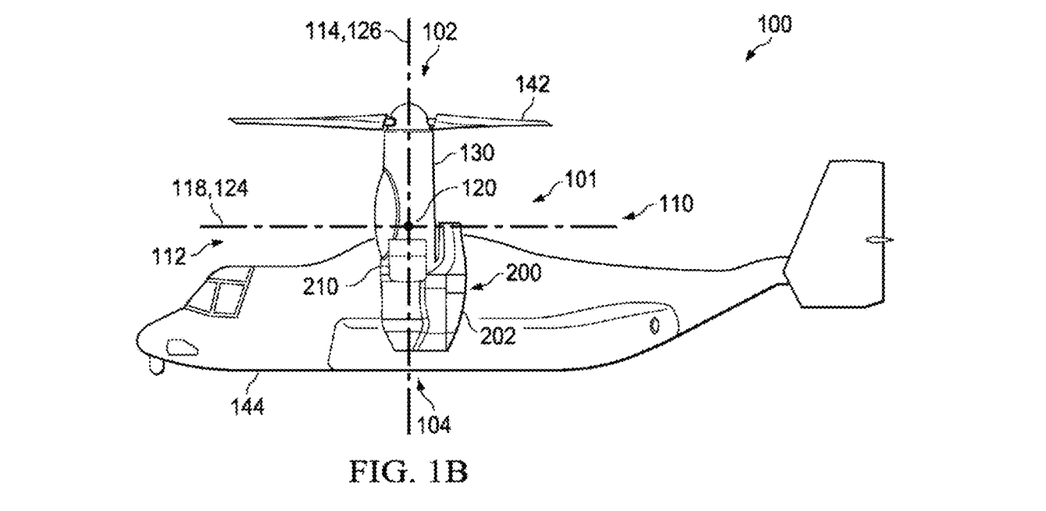

Referring to FIGS. 1A and 1B, an orthogonal right side view of an aircraft 100 according to an embodiment of the disclosure is shown. The aircraft 100 generally comprises nacelles 101 which carry rotors 142. In this embodiment, the nacelles 101 are supported by wings that are carried by a fuselage 144. FIG. 1A shows the aircraft 100 in an airplane mode while FIG. 1B shows the aircraft 100 in a hovering mode, with the modes being at least partially defined by an orientation of the nacelles 101 relative to the ground and/or a remainder of the aircraft 100.

Referring to FIGS. 2-5, a portion of an aircraft 100 according to an embodiment of the disclosure is shown. In this embodiment, the portion of the aircraft 100 shown may be referred to as the nacelle 101. Nacelle 101 may be described as generally comprising a front 102, rear 104, left 106, right 108, top 110, and bottom 112 and the following description and associated drawings may generally utilize directional indications to assist in identifying the directional orientation of the nacelle 101 and/or components of the nacelle 101 without the requirement that such an indication is an absolute identification of a directional extent of the nacelle 101. In other words, the above described directional indications are intended to generally clarify orientations of the components of the nacelle 101 relative to each other and to provide context to the associated figures, not limit the claims. Because the nacelle 101 is rotatable relative to the remainder of the aircraft, it is important to note that the same directional indicators while utilized in the discussion and associated figures that comprise the components of the nacelle 101 to provide a consistent frame of reference throughout the disclosure for the nacelle 101 components. However, it should further be noted that the aircraft 100 may comprise other traditional axes and coordinate systems that are sometimes inconsistent with the nacelle 101 directional conventions above as a function of the nacelle 101 being rotatable relative to the remainder of the aircraft 100.

The nacelle 101 further comprises a longitudinal axis 114, a lateral axis 116, and a vertical axis 118. The longitudinal axis 114 generally extends longitudinally in a front-rear direction relative to the nacelle 101. The lateral axis 116 generally extends laterally in a left-right direction relative to the nacelle 101. The vertical axis 118 generally extends vertically in a top-bottom direction relative to the nacelle 101. The longitudinal axis 114, lateral axis 116, and vertical axis 118 intersect each other at an origin 120 and may generally be described as defining a three dimensional Cartesian coordinate system. The nacelle 101 further comprises a lateral bisection plane 122, a longitudinal bisection plane 124, and a vertical bisection plane 126. The lateral bisection plane 122 is generally coincident with the lateral axis 116 and the vertical axis 118. The longitudinal bisection plane 124 is generally coincident with the longitudinal axis 114 and the vertical axis 118. The vertical bisection plane 126 is generally coincident with the lateral axis 116 and longitudinal axis 114.

While the axes 114, 116, and 118 and bisection planes 122, 124, and 126 are generally defined to facilitate discussion of the nacelle 101, the location of the origin 120 relative to the nacelle 101 and the orientation of the axes 114, 116, and 118 relative to the nacelle 101 and/or to a primary direction of forward movement of the aircraft 100 may be described differently without impact to the functionality of the aircraft 100, the nacelle 101, and/or the components of the nacelle 101 disclosed herein. In other words, unless otherwise noted herein, the defined orientations of the axes 114, 116, and 118 and bisection planes 122, 124, and 126 are provided as a frame of reference against which the nacelle 101 and the components of the nacelle 101 may be consistently described.

Still referring now to FIGS. 2-5 an oblique top-front view, an oblique top-rear view, an orthogonal front view, and an orthogonal rear view, respectively, of a portion of the aircraft 100 are shown. The aircraft 100 generally comprises a power system 128 and an exhaust system 200. In this embodiment, the power system 128 comprises a power cowling 130 configured to substantially envelope about the longitudinal axis 114 both an engine 132, such as a turbine engine, and a transmission 134 that may be selectively driven by the engine 132. While the engine 132 and the transmission 134 are depicted with specificity, in alternative embodiments, the engine 132 and the transmission 134 may be differently shaped and/or located differently relative to each other. Regardless of the details of the engine 132 and the transmission 134, the power system 128 comprises a power inlet 136 configured to receive cold air into the power cowling 130 and a power outlet 138 configured to expel hot air from the power cowling 130. In some cases, a mass flow rate of air passing through the power system 128 may be a function of at least one of a speed at which the engine 132 is operated and a speed at which the aircraft 100 and/or the power system 128 move relative to ambient air. Throughout this disclosure, unless specified otherwise, "hot air" refers to air comprising a temperature relatively higher than ambient air and which was increased in temperature primarily as a function of operation of the power system 128. Similarly, unless specified otherwise, "cold air" refers to air comprising a temperature less than a temperature of the hot air and may include ambient air, air heated by aircraft 100 components other than power system 128, and/or refrigerated air that may be cooler than ambient air. Most generally, the power system 128 is configured to selectively feed hot air to the exhaust system 200 during operation of the engine 132. In some embodiments, hot air may comprise a temperature equal to about an ambient environment temperature (having a value between of about −130 degrees F. to about 140 degrees F. at engine startup) to about 2,000 degrees F.

The exhaust system 200 comprises an exhaust cowling 202, a mixer duct 204, an adaptive engine suppressor (AES) 206, a cavity supply duct 208, and a surface supply duct 210. Most generally, the exhaust cowling 202 is configured for attachment to the power cowling 130 so that the power outlet 138 (see FIG. 6) is generally upstream of the exhaust system 200. As will be explained in detail below, ambient air may enter and exit the power system 128 at a mass flow rate substantially attributable to a speed of operation of the engine 132 and/or a translational speed of the power cowling 130 relative to the ambient air. Hot air exiting the power system 128 may be received by the exhaust system 200 at a hot air mass flow rate. Most generally, the exhaust system 200 may mix the hot air with cold air supplied to the exhaust system 200 via one or both of the cavity supply duct 208 and the surface supply duct 210. In this embodiment, the cold air mass flow rates through each of the cavity supply duct 208 and the surface supply duct 210 may be at least partially attributable to a translational speed of the cavity supply duct 208 and the surface supply duct 210 relative to the ambient air, respectively.

Figure 2:
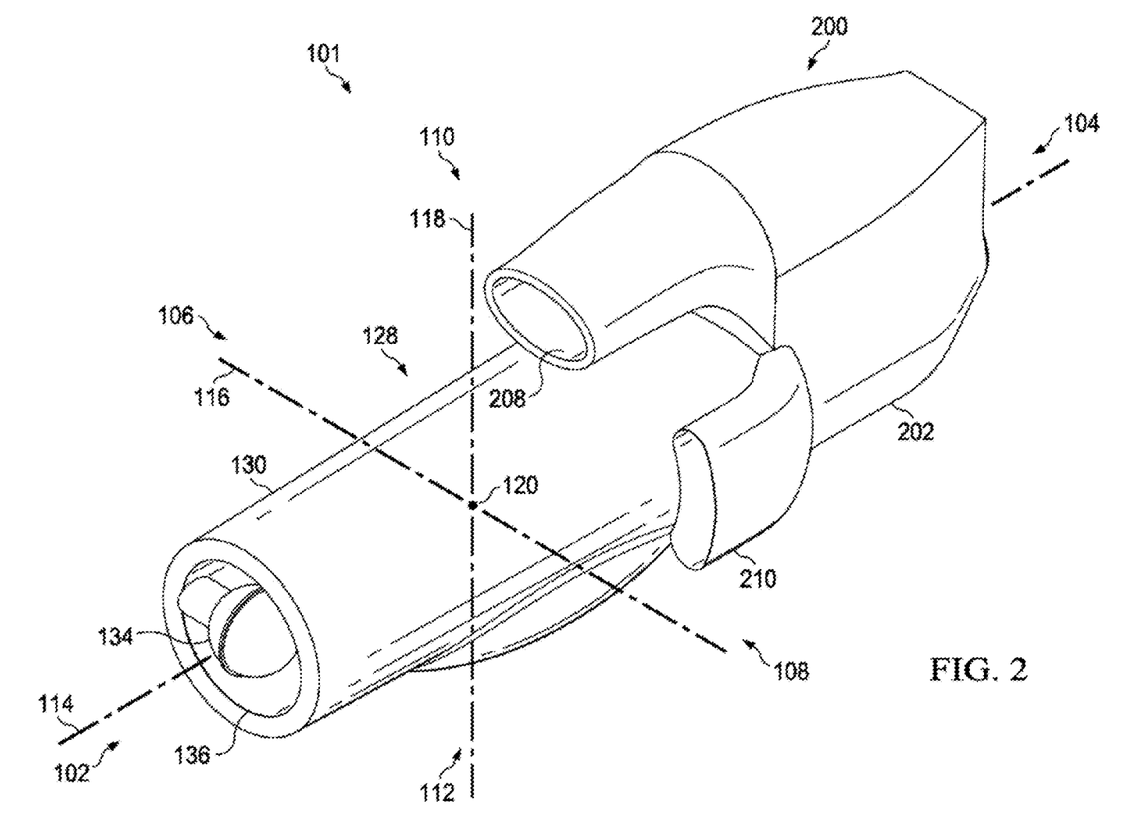
FIG. 2 is an oblique top-front view of a portion of an aircraft comprising an exhaust system according to an embodiment of the disclosure.
Figure 3:
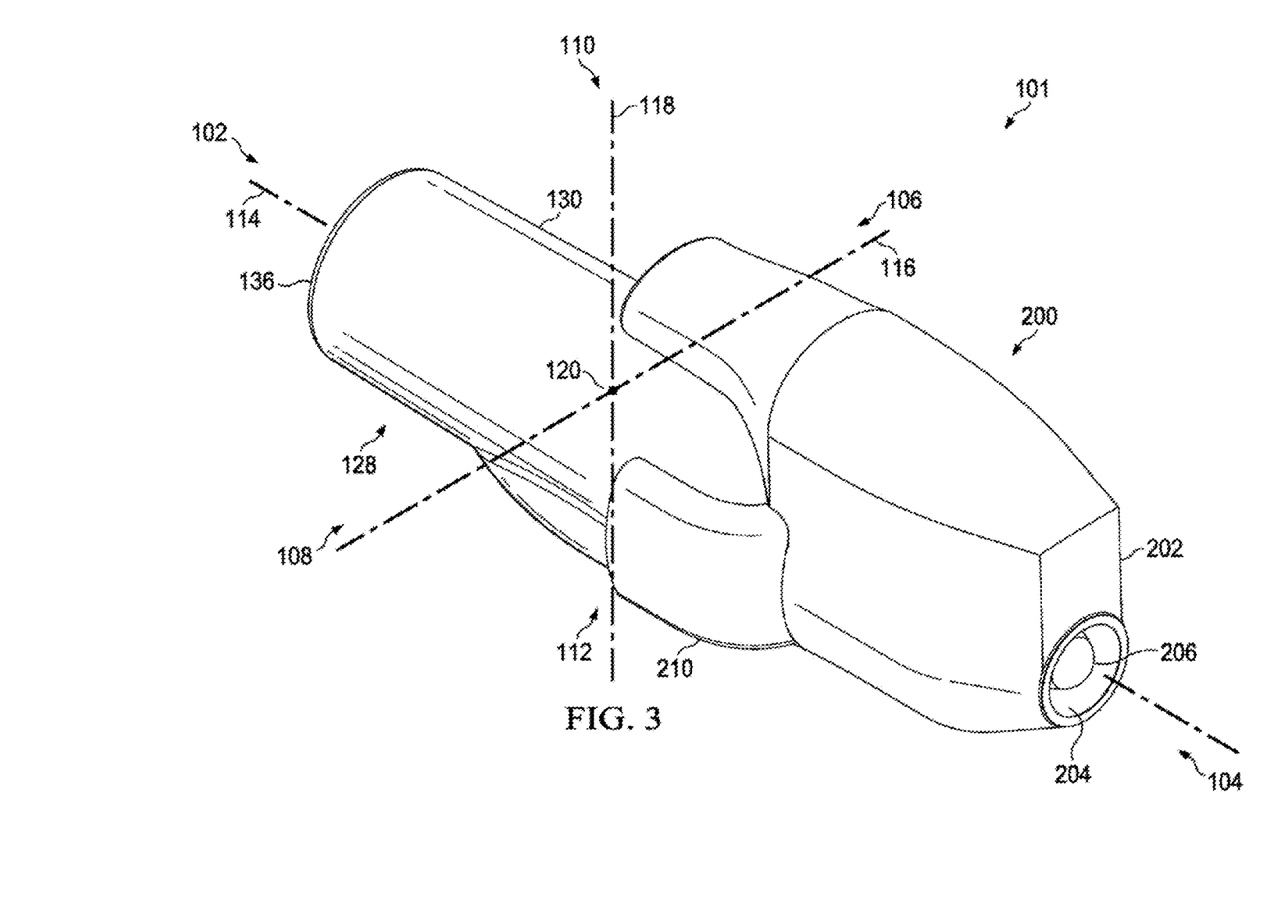
FIG. 3 is an oblique top-rear view of the portion of the aircraft of FIG. 2.
Figures 4, 5:
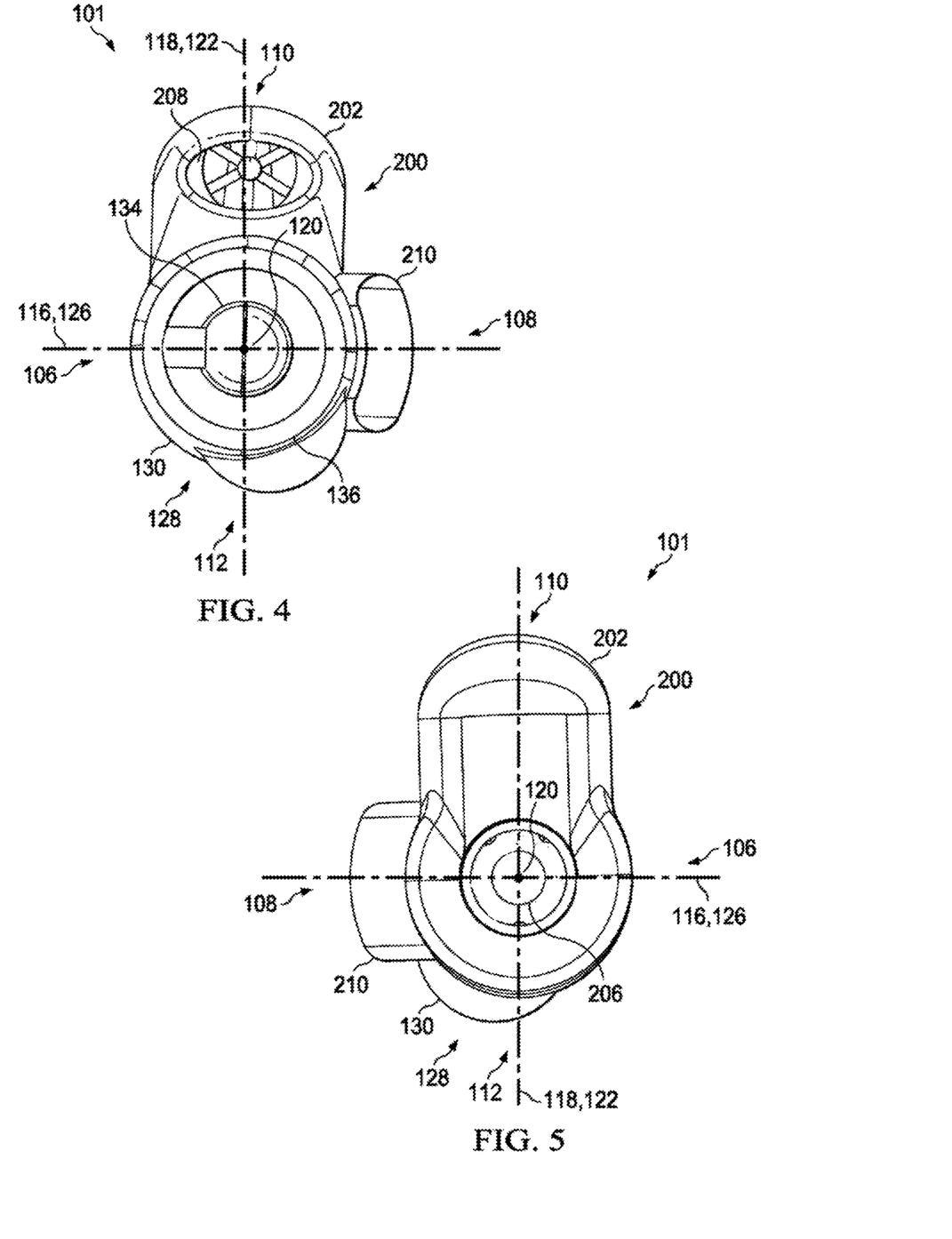
FIG. 4 is an orthogonal front view of a portion of the aircraft of FIG. 2.
FIG. 5 is an orthogonal rear view of the portion of the aircraft of FIG. 2.
Figure 6:
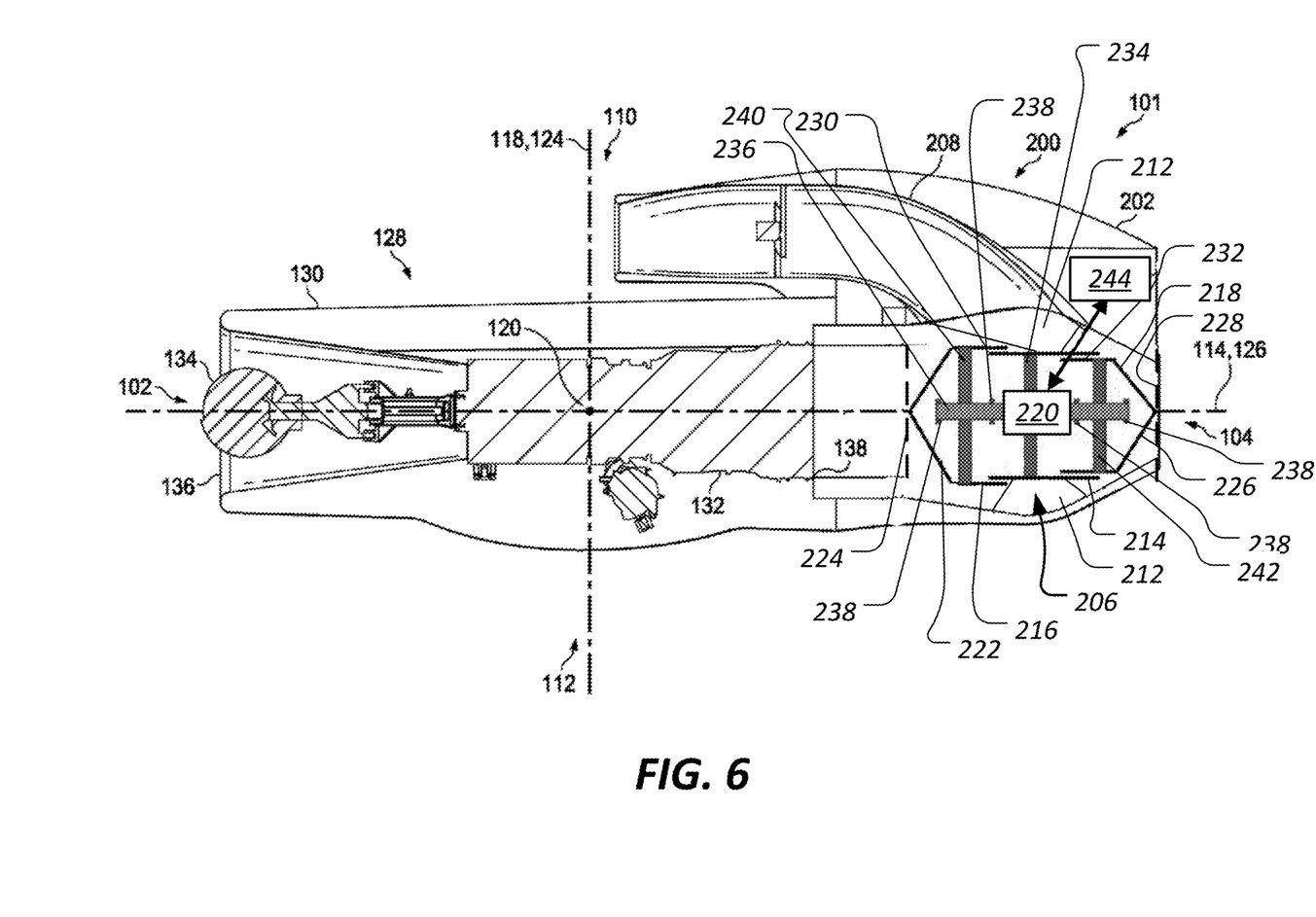
FIG. 6 is an orthogonal right cut-away view of the portion of the aircraft of FIG. 2 cut along a lateral bisection plane.

Referring now to FIG. 6, an orthogonal right cut-away view cut along lateral bisection plane 122 is shown of the portion of the aircraft nacelle of FIG. 2. FIG. 6 illustrates that the AES 206 can be supported within the exhaust system 200 by ducts 212. The ducts 212 can provide cooling air to a stationary centerbody 214 of the AES 206. In some embodiments, the centerbody 214 comprises a substantially tubular structure. FIG. 6 further illustrates that the AES 206 further comprises an forward cap 216, an aft cap 218, and a motor 220 configured to selectively move each of the forward cap 216 and aft cap 218 relative to the centerbody 214. In this embodiment, the forward cap 216 generally comprises a cone shaped nose 222 pointed toward an engine exhaust plane 224. Similarly, the aft cap 218 generally comprise a cone shaped nose 226 pointed toward an exhaust exit plane 228. The forward cap 216 further comprises an outer sleeve 230 connected to the nose 222 and the outer sleeve 230 comprises an inside diameter larger than an outside diameter of the centerbody 214 so that the centerbody 214 can be at least partially received within the outer sleeve 230. The aft cap 218 further comprises an inner sleeve 232 connected to the nose 226 and the inner sleeve 232 comprises an outside diameter smaller than an inside diameter of the centerbody 214 so that the centerbody 214 can at least partially receive the inner sleeve 232.

In this embodiment, the motor 220 is housed within the centerbody 214 and is mounted to the centerbody 214 via a motor bracket 234. A central threaded shaft 236 comprising integral position stops 238 passes through the centerbody 214 and extends into an interior space of each of the forward cap 216 and the aft cap 218. The motor 220 is coupled to the shaft 236 so that the motor 220 can be selectively operated to rotate the shaft 236. The shaft is further coupled to the forward cap 216 via a forward screw bracket 240 and is coupled to the aft cap 218 via an aft screw bracket 242. Each of the screw brackets 240, 242 comprise a threaded nut or structure with a similar threaded aperture to receive the threaded shaft 236. The exhaust system 200 can further comprise a controller 244 configured to control motor 220 in response to manual commands from a pilot or other user of the aircraft 100 and/or in response to automated flight control signals from other onboard flight control systems, such as, but not limited to, flight control systems configured to determine and/or report which flight regime the aircraft 100 is operating.

Figure 7:
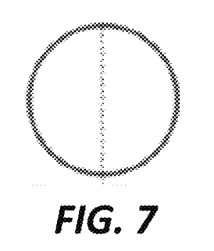
FIG. 7 is a schematic representation of a cross-sectional area of an engine exhaust plane with a forward cap removed from the plane.
Figure 8:
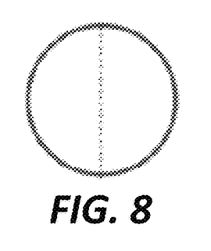
FIG. 8 is a schematic representation of a cross-sectional area of an exhaust exit plane with an aft cap removed from the plane.
Figure 9:
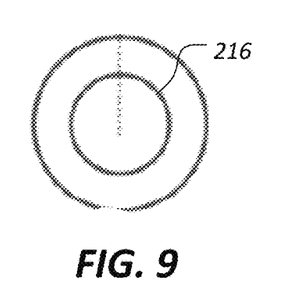
FIG. 9 is a schematic representation of a cross-sectional area of an engine exhaust plane with a forward cap intersecting the plane.
Figure 10:
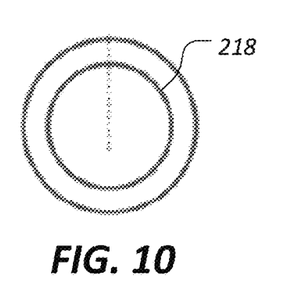
FIG. 10 is a schematic representation of a cross-sectional area of an exhaust exit plane with an aft cap intersecting the plane.

In operation, a method of managing aircraft 100 exhaust may comprise first operating the engine 132 of the power system 128, thereby pulling ambient air into the power inlet 136 and rejecting hot air out of the power system 128 through power outlet 138 at a hot air mass flow rate. The hot air may be received into the exhaust system 200 when passing through the engine exhaust plane 224 and relatively cooler air may exit the exhaust system when passing through the exhaust exit plane 228. When changes in aircraft 100 performance are needed, the AES 206 can be operated to change at least one of a cross-sectional flow area available at the engine exhaust plane 224 and the exhaust exit plane 228. For example, when a pilot or other user of aircraft 100 and/or a flight control computer of aircraft 100 indicates to the controller 244 that fuel efficiency and/or power needs to be increased, the controller 244 can cause motor 220 to rotate the shaft 236 so that the forward cap 216 intersects the engine exhaust plane 224 to a lesser degree and/or by fully removing the forward cap 216 from the engine exhaust plane 224 (as shown in FIG. 7). Similarly, when a pilot or other user of aircraft 100 and/or a flight control computer of aircraft 100 indicates to the controller 244 that maximum power is needed for Hover Out of Ground Effect (HOGE) manuevers, the controller 244 can cause motor 220 to rotate the shaft 236 so that the aft cap 218 intersects the exhaust exit plane 228 to a lesser degree and/or by fully removing the aft cap 218 from the exhaust exit plane 228 (as shown in FIG. 8). Further, when a pilot or other user of aircraft 100 and/or a flight control computer of aircraft 100 indicates to the controller 244 that the aircraft 100 is in a high threat environment where exhaust heat signatures are undesirable, the controller 244 can cause motor 220 to rotate the shaft 236 so that the forward cap 216 increasingly intersects the engine exhaust plane 224 (as shown in FIG. 9). Still further, when a pilot or other user of aircraft 100 and/or a flight control computer of aircraft 100 indicates to the controller 244 that maximum thrust for forward flight is needed (such as when the aircraft 100 is flying in an airplane mode), the controller 244 can cause motor 220 to rotate the shaft 236 so that the aft cap 218 intersects the exhaust exit plane 228 to a greater degree (as shown in FIG. 10). The concept optimizes the exhaust flow area to better match the engine back pressure requirements for optimal engine equivalent shaft horsepower and specific fuel consumption. In some embodiments, the controller 244 can adapt the flow areas to the optimal flow areas and area ratios of the engine exhaust and nacelle exit nozzles for selected flight regimes. In some embodiments, optimal configuration for a hovering or low speed operation of the aircraft is with minimal back pressure which requires either a larger exit nozzle area to engine exhaust area ratio, or a diverging nozzle geometry. In other words, the controller 244 can control motor 220 to move the caps 216, 218 so that the upstream cross-sectional area for entering the AES 206 is relatively smaller than the downstream cross-sectional flow area for leaving the AES 206. Providing high-speed and higher thrust configuration requires a higher back pressure requirement with a smaller engine exit area and exhaust areas or converging nozzle geometry. In other words, the controller 244 can control motor 220 to move the caps 216, 218 so that the upstream cross-sectional flow area for entering the AES 206 is relatively greater than the downstream cross-sectional flow area for leaving the AES 206. In some embodiments, the controller may be provided with what is essentially an infrared suppression maximized mode and an alternative mode where infrared suppression is minimized or discontinued.

Figure 11:
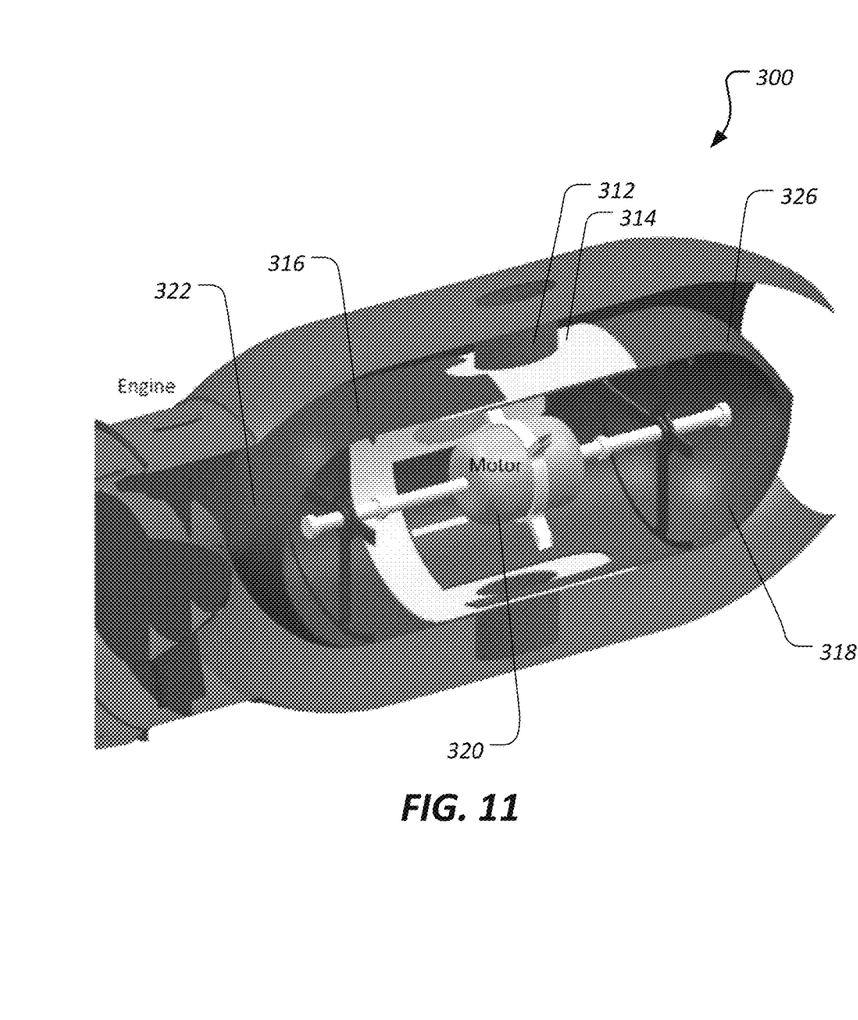
FIG. 11 is an oblique cut-away view of an exhaust system according to another embodiment.

Referring now to FIG. 11, an alternative embodiment of an AES is shown as AES 300. AES 300 is substantially similar to AES 206 and can supported within the exhaust system 200 or any other suitable exhaust system by ducts 312. The ducts 312 can provide cooling air to a stationary centerbody 314 of the AES 300. The centerbody 314 comprises a substantially tubular structure. AES 300 further comprises a forward cap 316, an aft cap 318, and a motor 320 configured to selectively move each of the forward cap 316 and aft cap 318 relative to the centerbody 314 in substantially the same manner as described above with regard to AES 206. However, the forward cap 316 and aft cap 318 do not comprise the conical noses as described above with regard to AES 206. Instead, the noses 322, 326 are relatively rounder and when moved relative to the engine exhaust plane 324 and exhaust exit plane 328, the changes in flow area do not change linearly.

In some embodiments, a single motor, actuator, and/or other movement production device and/or system can provide movement for both forward and aft caps of an AES. However, in alternative embodiments, multiple motors, actuators, and/or other movement production devices and/or systems can be utilized to move the caps. In some cases where a single motor, actuator, and/or other movement production device is utilized to move both forward and aft caps, differential mechanisms can be utilized to move the caps at different rates. For example, in some embodiments the shaft moved by an AES motor may comprise threads having a first pitch associated with the forward cap while threads with a different pitch are associated with the aft cap, thereby moving the forward and aft caps at different rates by rotating the single shaft. In alternative embodiments, a ratio of cross-sectional flow area between the engine exhaust plane and the exhaust exit plane may instead and/or additionally be achieved by providing differently sized and/or shaped noses on the caps of an AES. In some cases, the shapes and/or sizes of the noses of the caps of an AES may be so different that even though the caps are moved at a same rate by a shared motor and/or shaft, the rate of change in cross-sectional area generated by the movement is not proportional.

The Adaptive Engine Suppressor (AES) operation can be based on the different threat environments an aircraft encounters. The variable geometry at both ends of the AES will allow the aircraft operator to have a selectable infrared signature with the ability to turnoff infrared suppression and maximize aircraft performance, or adjust it based upon mission or flight conditions. When in a non-threat environments, the flight control computer or pilot can select to optimize for mission payload and range capability and eliminate infrared suppression by adjusting the location of the forward and aft caps.

Figure 12:
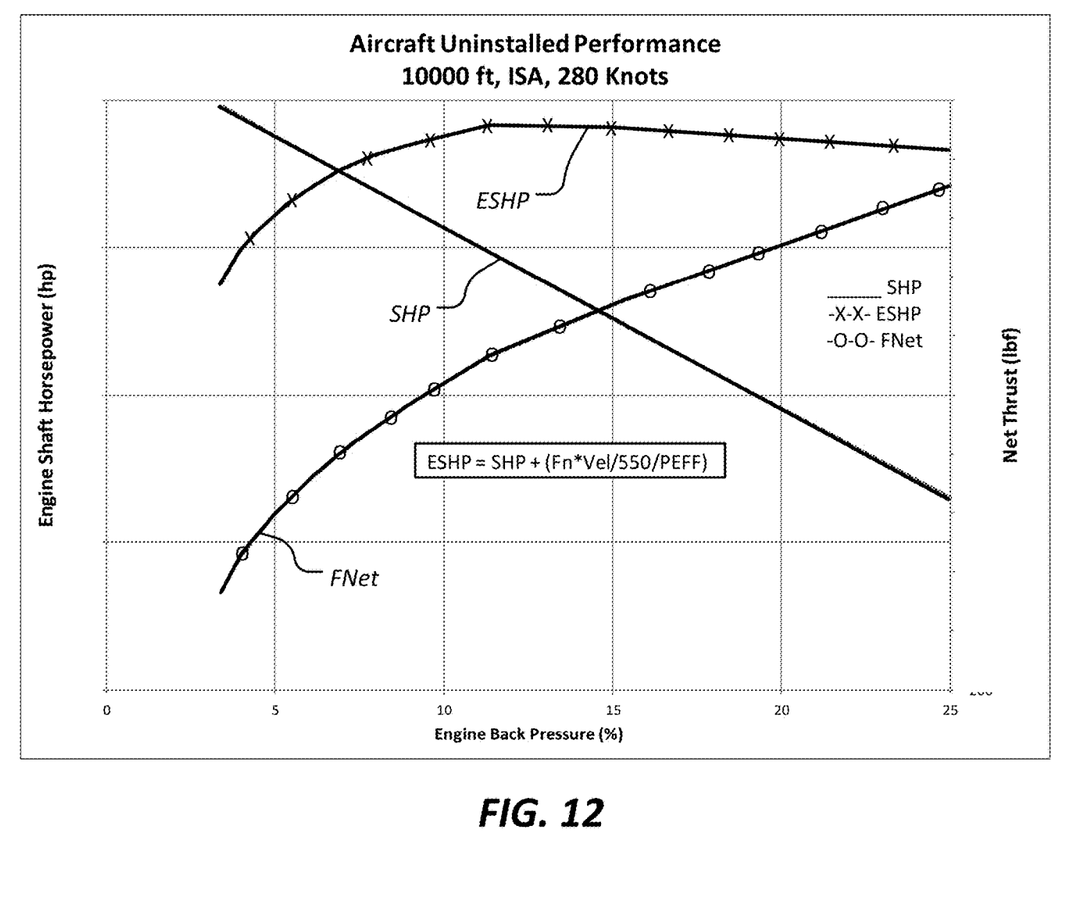
FIG. 12 is a graph showing that as engine back pressure is increased the engine shaft horsepower produced by the engine is reduced while the nacelle propulsive net thrust is increased.
Figure 13:
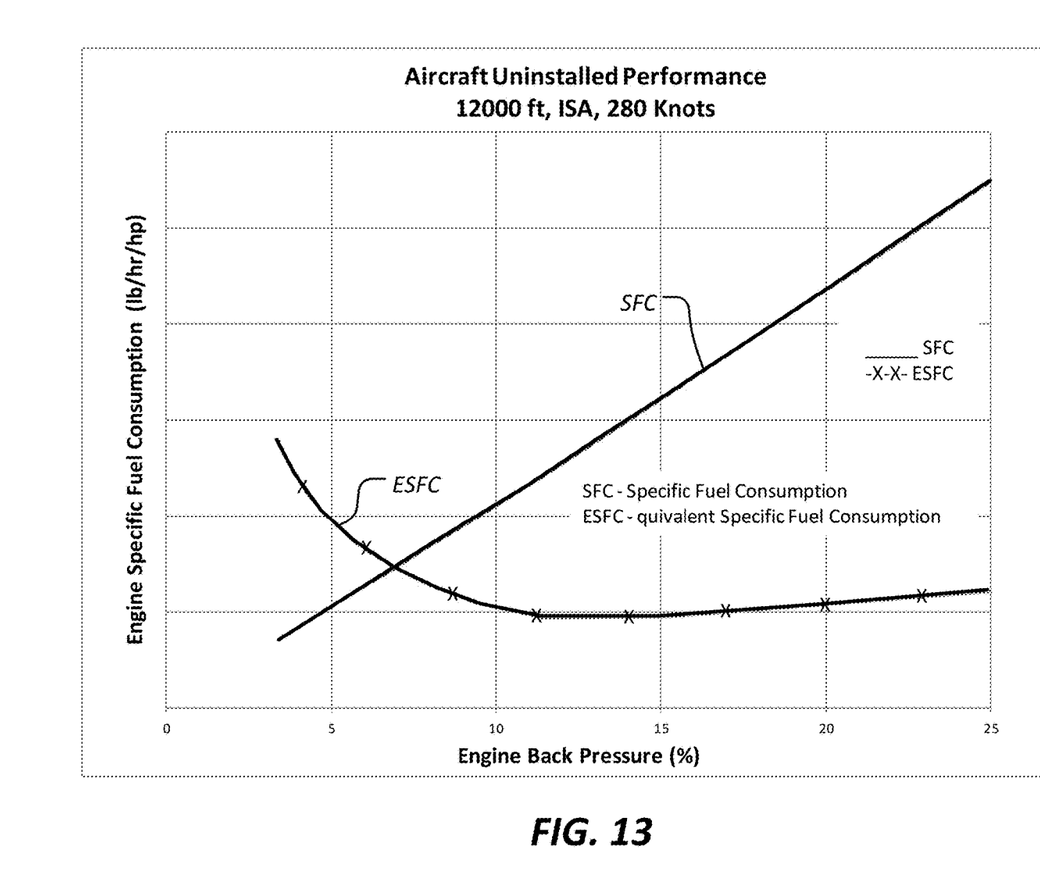
FIG. 13 is a graph that shows an improvement in the equivalent specific fuel consumption (SFC) as related to an initial increase in back pressure.
Figure 14:
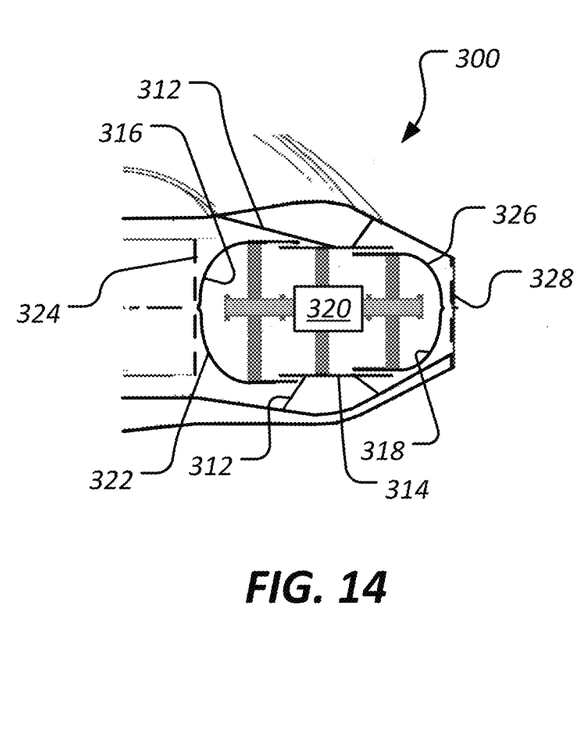
FIG. 14 is a simplified schematic cut-away view of a portion of the exhaust system of FIG. 11.

The AESs described herein provide greater benefit to higher speed aircraft, such as a tiltrotors, due to the ability of the variable exit flow areas to produce optimized forward thrust and improved fuel efficiency at high flight speeds. FIG. 12 shows that as engine back pressure is increased the engine shaft horsepower produced by the engine is reduced while the nacelle propulsive net thrust is increased. It should be noted that the equivalent shaft horsepower, which converts the net thrust to horsepower, increases for initial increase in engine back pressure before turning down at approximately twelve percent back pressure. Put another way, as the engine back pressure is increased, the equivalent engine shaft horsepower initially increases before flattening out with diminishing returns beyond about 12% back pressure. Similarly, FIG. 13 shows the same trend of improving the equivalent specific fuel consumption (SFC) for the initial increase in back pressure. The variable engine exit area (front end of the AES) has the greatest effect on engine SFC while the variable area on the AES exit has the greatest affect on the nacelle net thrust. Even in equivalent shaft horsepower for conventional helicopters with lower flight speed regimes, opening the exit area can increase engine power which can be useful in non-threat environments.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An aircraft, comprising:
an exhaust system, comprising:
an engine exhaust plane associated with an entrance to the exhaust system;
an exhaust exit plane associated with an exit of the exhaust system;
a forward cap movable relative to the engine exhaust plane and configured to selectively intersect the engine exhaust plane;
an aft cap movable relative to the exhaust exit plane and configured to selectively intersect the exhaust exit plane:
a centerbody disposed at least partially longitudinally between the forward cap and the aft cap, each of the forward cap and the aft cap being movable relative to the centerbody, wherein the forward cap, the aft cap, and the centerbody collectively form an interior space configured to be fed cooling air via at least one duct connected with the centerbody, wherein a position of the centerbody is fixed relative to the at least one duct.

2. The aircraft of claim 1, further comprising a motor, wherein the forward cap and the aft cap are moved in response to operation of the motor.

3. The aircraft of claim 2, wherein the forward cap and the aft cap are configured to move at different rates.

4. The aircraft of claim 2, wherein the forward cap and the aft cap are configured to move at the same rate.

5. The aircraft of claim 1, wherein the forward cap comprises a first nose geometry and the aft cap comprises a second nose geometry, wherein the first nose geometry is the same as the second nose geometry.

6. The aircraft of claim 1, wherein the forward cap comprises a first nose geometry and the aft cap comprises a second nose geometry, wherein the first nose geometry and the second nose geometry are different.

7. The aircraft of claim 1, wherein a nose geometry of at least one of the forward cap and the aft cap comprises a conical shape.

8. The aircraft of claim 1, further comprising a shaft, wherein the forward cap and the aft cap are both moved in response to rotation of the shaft.

9. The aircraft of claim 8, wherein the shaft comprises threads having a first pitch associated with the forward cap and threads having a second pitch associated with the aft cap, wherein the first pitch and the second pitch are not equal.

10. An exhaust system, comprising:
an engine exhaust plane associated with an entrance to the exhaust system;
an exhaust exit plane associated with an exit of the exhaust system;
a forward cap movable relative to the engine exhaust plane and configured to selectively intersect the engine exhaust plane;
an aft cap movable relative to the exhaust exit plane and configured to selectively intersect the exhaust exit plane; and
a centerbody disposed at least partially longitudinally between the forward cap and the aft cap, each of the forward cap and the aft cap being movable relative to the centerbody, wherein the forward cap, the aft cap, and the centerbody collectively form an interior space configured to be fed cooling air via at least one duct connected with the centerbody, wherein a position of the centerbody is fixed relative to the at least one duct.

11. The aircraft of claim 10, further comprising a motor, wherein the forward cap and the aft cap are moved in response to operation of the motor.

12. The aircraft of claim 11, wherein the forward cap and the aft cap are configured to move at different rates.

13. The aircraft of claim 11, wherein the forward cap and the aft cap are configured to move at the same rate.

14. The aircraft of claim 10, wherein the forward cap comprises a first nose geometry and the aft cap comprises a second nose geometry, wherein the first nose geometry is the same as the second nose geometry.

15. The aircraft of claim 10, wherein the forward cap comprises a first nose geometry and the aft cap comprises a second nose geometry, wherein the first nose geometry and the second nose geometry are different.

16. The aircraft of claim 10, wherein a nose geometry of at least one of the forward cap and the aft cap comprises a conical shape.

17. The aircraft of claim 10, further comprising a shaft, wherein the forward cap and the aft cap are both moved in response to rotation of the shaft.

18. The aircraft of claim 17, wherein the shaft comprises threads having a first pitch associated with the forward cap and threads having a second pitch associated with the aft cap, wherein the first pitch and the second pitch are not equal.

19. A method of changing performance of an aircraft, comprising:
    providing an exhaust system, comprising:
        an engine exhaust plane associated with an entrance to the exhaust system;
        an exhaust exit plane associated with an exit of the exhaust system;
        a forward cap movable relative to the engine exhaust plane and configured to selectively intersect the engine exhaust plane;
        an aft cap movable relative to the exhaust exit plane and configured to selectively intersect the exhaust exit plane; and
        a centerbody disposed at least partially longitudinally between the forward cap and the aft cap, each of the forward cap and the aft cap being movable relative to the centerbody, wherein the forward cap, the aft cap, and the centerbody collectively form an interior space configured to be fed cooling air via at least one duct connected with the centerbody, wherein a position of the centerbody is fixed relative to the at least one duct; and
    moving at least one of the forward cap and the aft cap through operation of a single movement production device.

20. The method of claim 19, wherein the exhaust system further comprises a shaft, wherein the single movement production device comprises a single motor and wherein the forward cap and the aft cap are moved by the same shaft at different rates.

* * * * *